(12) United States Patent
Gordon-Ingram

(10) Patent No.: US 7,289,042 B2
(45) Date of Patent: Oct. 30, 2007

(54) READER FOR A SCALE MARKING

(75) Inventor: Iain Robert Gordon-Ingram, Wiltshire (GB)

(73) Assignee: Renishaw, PLC, Gloucestershire (GB)

(*) Notice: Subject to any disclaimer, the term of this patent is extended or adjusted under 35 U.S.C. 154(b) by 0 days.

(21) Appl. No.: 10/561,204

(22) PCT Filed: Jul. 19, 2004

(86) PCT No.: PCT/GB2004/003122

§ 371 (c)(1),
(2), (4) Date: Dec. 19, 2005

(87) PCT Pub. No.: WO2005/012841

PCT Pub. Date: Feb. 10, 2005

(65) Prior Publication Data

US 2006/0283035 A1 Dec. 21, 2006

(30) Foreign Application Priority Data

Jul. 19, 2003 (GB) ................................. 0316921.6

(51) Int. Cl.
*H03M 1/22* (2006.01)
(52) U.S. Cl. .......................................... 341/13; 341/14

(58) Field of Classification Search ............. 341/10–30
See application file for complete search history.

(56) References Cited

U.S. PATENT DOCUMENTS

| 4,560,870 A | * | 12/1985 | Ramamurti | ................... 341/13 |
| 6,051,971 A | | 4/2000 | Holden | |
| 6,392,224 B1 | | 5/2002 | Holzapfel et al. | |
| 6,452,158 B1 | * | 9/2002 | Whatley et al. | ............... 341/13 |
| 6,816,091 B1 | * | 11/2004 | Chee | ........................... 341/13 |

FOREIGN PATENT DOCUMENTS

| DE | 198 33 439 A1 | | 2/1999 |
| DE | 198 33-439 A1 | * | 2/1999 |
| WO | WO 02/065061 A1 | | 8/2002 |

* cited by examiner

*Primary Examiner*—Lam T. Mai
(74) *Attorney, Agent, or Firm*—Oliff & Berridge, PLC

(57) ABSTRACT

The invention relates to a reference mark detector for use with a metrological scale or encoder (10) having a patterned reference mark rm movable relative to the reference mark detector. The detector may comprise a photodetector array (20) for detecting the patterned reference mark, the array comprising at least two sets of detector elements A and B each set being formed as a pattern which relates to the pattern of the reference mark. The two sets may be separate rows of photodectors or different elements of the same row of photodetectors. The pattern is preferably irregular.

13 Claims, 4 Drawing Sheets

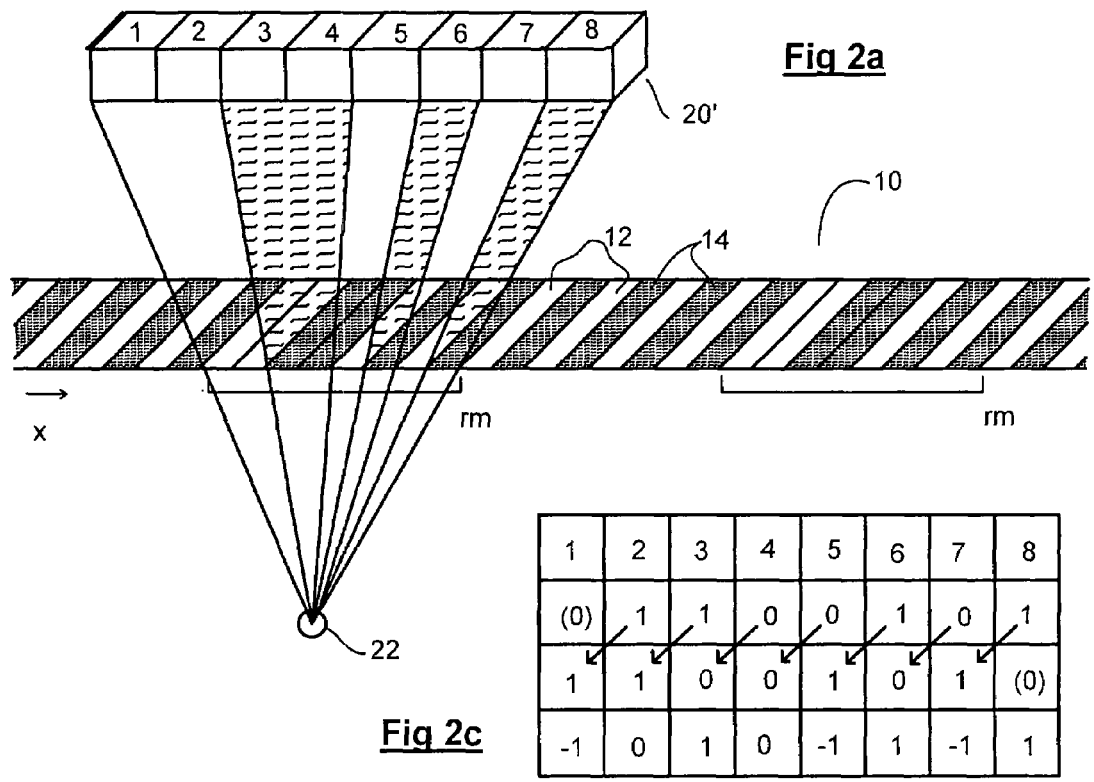
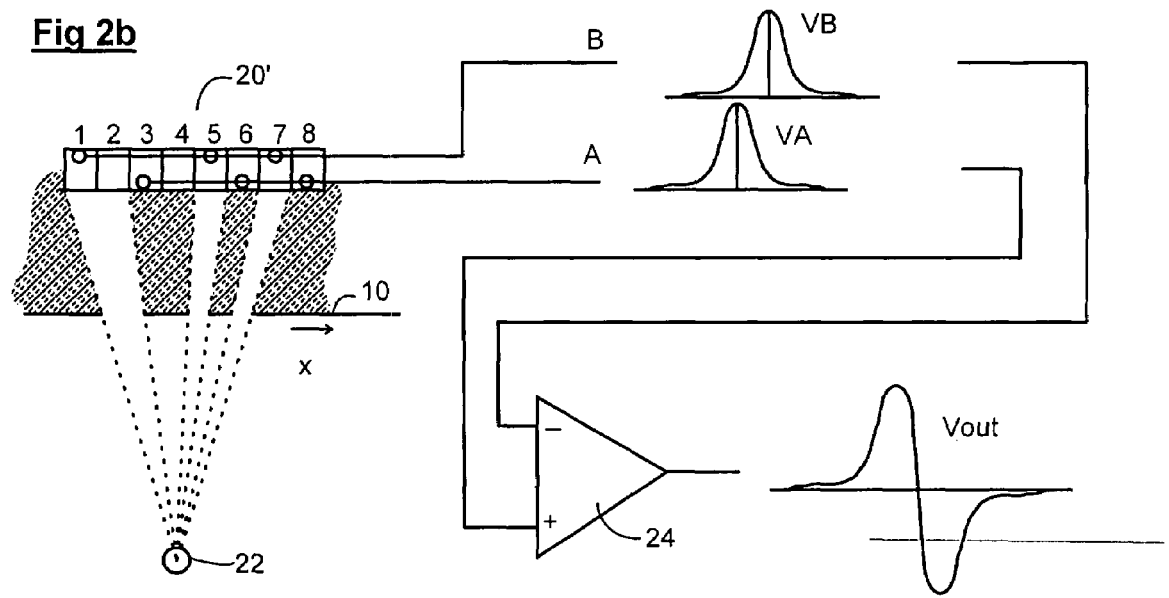

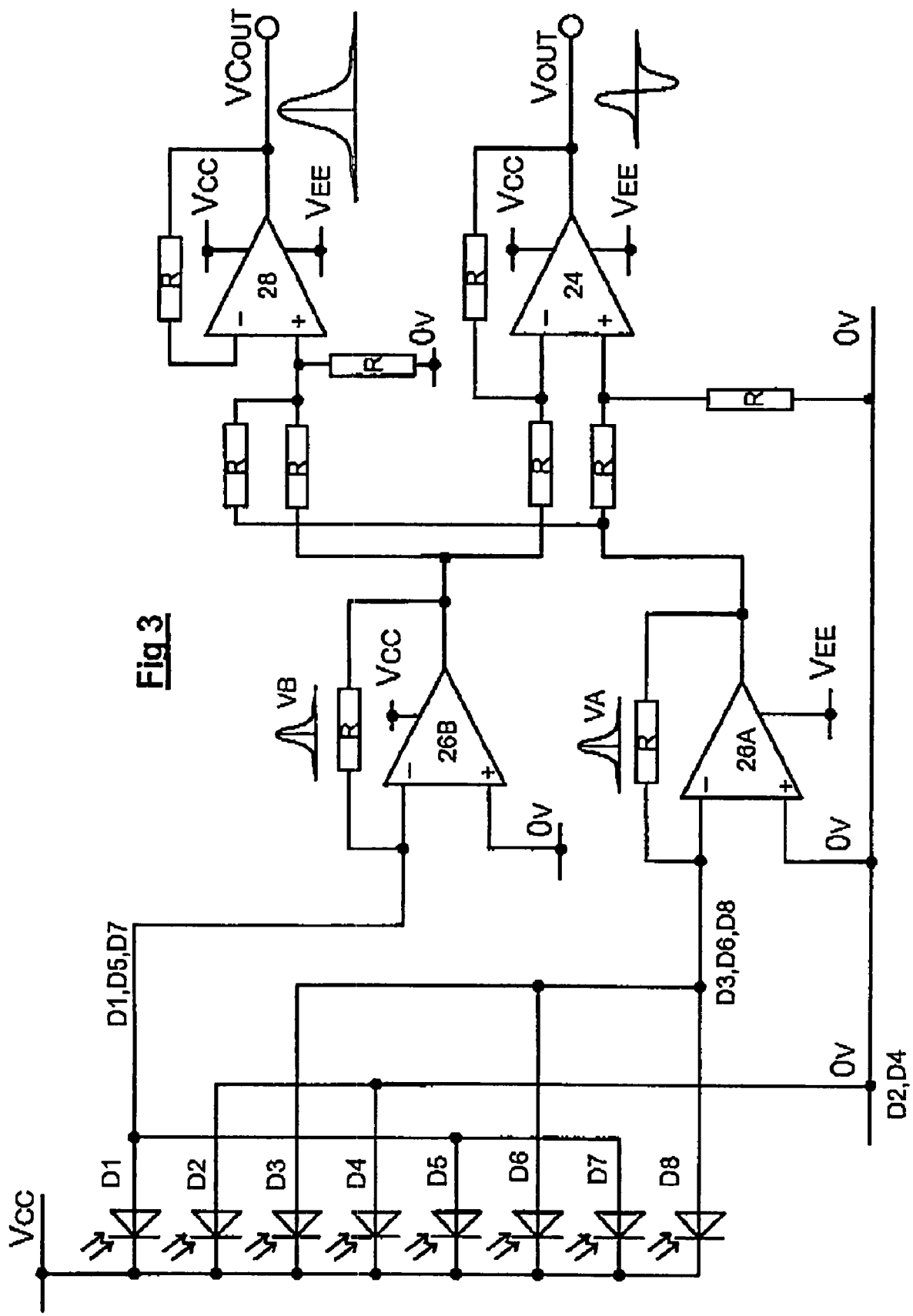

READER FOR A SCALE MARKING

The present invention relates to a detector for detecting a reference mark or the like, in particular but not exclusively during measurement operations which use a metrological scale or encoder and a reader therefor.

The detection of reference marks is disclosed in our prior patent publication no. PCT/GB02/00638, the disclosure of which is incorporated herein by reference.

Reference marks allow a reader to find its position and are usually provided separately to periodic scale marks which provide an incremental signal to the reader for determining displacement. A reference mark could be anything that is recognisable by the reader. In practice a pattern is used because it is simple to produce and is more reliable, producing fewer false readings. When a pattern is used the reader will have a similar pattern so that when the mark and reader align a stronger signal is provided by the reader.

Combined reference and scale marks have been used commercially. In such instances the reference mark may be formed by a pattern of missing bits of the scale. The incremental signal from the periodic scale is read over a portion of the scale large enough to compensate for missing bits of the scale.

In order to improve accuracy known scale readers have employed two detectors e.g. photodiodes, usually called split detectors, to read a scale. The two photodiodes have been offset one relative to the other in the direction of measurement by a small amount. When this configuration has been used the output of one photodiode lags behind (or is in front of) the other. A known technique is to produce a zero crossing output (detailed below) from the two photodiodes which improves detection accuracy.

The invention provides a reference mark detector for use with a metrological scale or encoder having a patterned reference mark movable relative to the reference mark detector the detector comprising a detector array for detecting the patterned reference mark, the detector array comprising at least two sets of detector elements each set being formed as a pattern which relates to the pattern of the reference mark.

Preferably each element of each set has an output, each of the outputs from each of the elements of a set is summed with the other elements of the same set, and the summed output from a second of the sets is subtracted from the summed output of a first of the sets.

More preferably the pattern of the first and second set of detectors is irregular.

Preferably the detector array comprises two rows of elements, the first of the rows containing a first one of the sets of detector elements and the second row containing a second one of the sets of detector elements.

More preferably the first of the rows is displaced relative to the second of the rows in a direction of movement of the reference mark detector relative to the reference mark in use.

Alternatively the detector array comprises a single row, a first set of detector elements and a second set of detector elements comprising detector elements in the row.

Preferably the first set of detector elements are connected together to provide a distinct output when the reference mark is detected in a first position and the second set are connected together to provide a distinct output when the reference mark is detected at a position different to the first position.

More preferably the position of the first and second set of detector elements correspond to positions in a notional table, the first row of the table containing high or low values corresponding to the pattern of the reference mark, the second row of the table containing the same values, the values in the second row being displaced relative to the position in the table of the values of the first row in the direction of the rows, each value from the second row being deducted from the values of the first row immediately above the values of the second row to form a resultant for each position in the table, the position in the table of the positive high values of each resultant representing the positions of the first set of detector elements and the positions in the table of the negative high values of each resultant representing the positions of second set of detector elements.

The summing of the outputs and the subtraction of the sums may be done digitally.

The invention provides also a metrological scale or encoder having periodic markings for incremental measurement operations and a scale reader for determining the displacement of the reader relative to the scale by reading the periodic markings, the scale including a patterned reference mark, the scale reader including a reference mark detector including a detector array, the array comprising at least two sets of detector elements, each set having separately processed outputs and including means for producing a signal from the outputs of the elements having a value which crosses zero when the reference mark is detected by the reference mark detector.

Preferably the means for producing the signal includes summing the outputs of each of the elements in a first set of the said at least two sets to produce a first summed output and summing the output from a second set of the said at least two sets to produce a second summed output, then subtracting the second summed output from the first summed output.

The array may be formed as at least two rows and a first one of the said sets may be included in one of the rows, and a second set may be included in an other of the two rows.

Alternatively the array may be formed as a single row and a first and second set of sets of elements may be comprised in the single row.

Preferably the reference mark comprises bits missing or added to the periodic markings of the scale or encoder.

Thus embodiments of the invention provide a reference mark reader having a single patterned array of detector elements and a zero crossing output when a reference mark is detected. In this way a zero crossing output can be obtained from a single row of detectors.

The detectors mentioned above may be photodiodes or a photodiode block. The summed outputs may be subtracted by means of a difference amplifier.

By way of example, embodiments of the invention will now be described with reference to the accompanying drawings, in which:

FIGS. 1a and b show a reference mark reader arrangement according to the invention;

FIGS. 2a,b and c show another reference mark reader arrangement according to the invention;

FIG. 3 shows an electrical schematic diagram of the components used in the reader shown in FIGS. 2a,b and c;

Figure 1A:
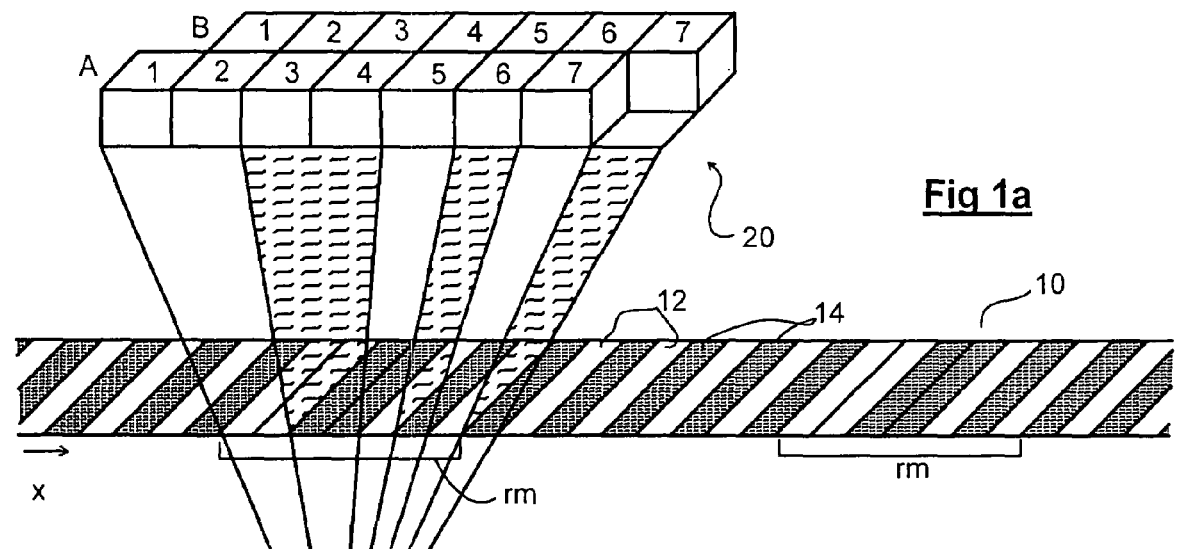
FIG. 1a shows a novel arrangement of a reference mark reader 20 and a reference mark rm incorporated into an incremental scale 10.

In this arrangement a scale 10 has periodic markings of alternating transparent 12 and opaque 14 areas, e.g. chrome on glass. These markings are used in a conventional way to produce a signal indicative of displacement, using a conventional reader (not shown) adjacent the reference mark detector 20. In this arrangement a scale can move in the direction of arrow x and, in practice, its opposite direction also. For simplicity travel in the x direction only is described.

Incorporated into the periodic scale markings 12 and 14 is a reference mark rm. In this example the mark is 7 periods long. The reference mark could be completely separate from the incremental scale in which case any size or shape of pattern could be used. The reference mark reader 20 has a point light source 22, light from which propagates through the transparent areas 12 and onto rows of detectors A and B. Each row of detectors is formed from 7 photodiode elements 1-7. The light will fall generally with little effect on the detector elements as the scale is moved relative to the detectors. The detector elements used relate to the pattern of the reference mark rm. The reference mark rm has a pattern 1100101 where "1" represents a transparent area 12 and "0" represents an opaque area 14. Therefore, detectors 1,2,5 and 7 in each row only are monitored, which corresponds to the illuminated detector elements when the reference mark 1100101 coincides with the corresponding pattern formed by those monitored detectors.

When the reference mark coincides with each detector element, rather than substantially ineffectual light falling on those detectors, each detector is fully illuminated and a sudden increase in output $V_A$ and $V_B$ is effected.

Detector rows A and B are staggered by one detector element width in this instance, so signal peaks $V_A$ and $V_B$ are staggered also. To improve accuracy signal $V_B$ is subtracted from signal $V_A$ at difference amplifier 24 to give an overall output signal $V_{OUT}$. It will be noted that $V_{OUT}$ crosses zero at a distinct point and this zero-crossing can be used to give accurate positional information.

In this embodiment a mask can be placed over the detector elements and all detectors can be monitored. This modification will achieve the same results as the arrangement illustrated. Alternatively, the unmonitored detectors 3,4 and 6 could be left out altogether.

Figure 1B:
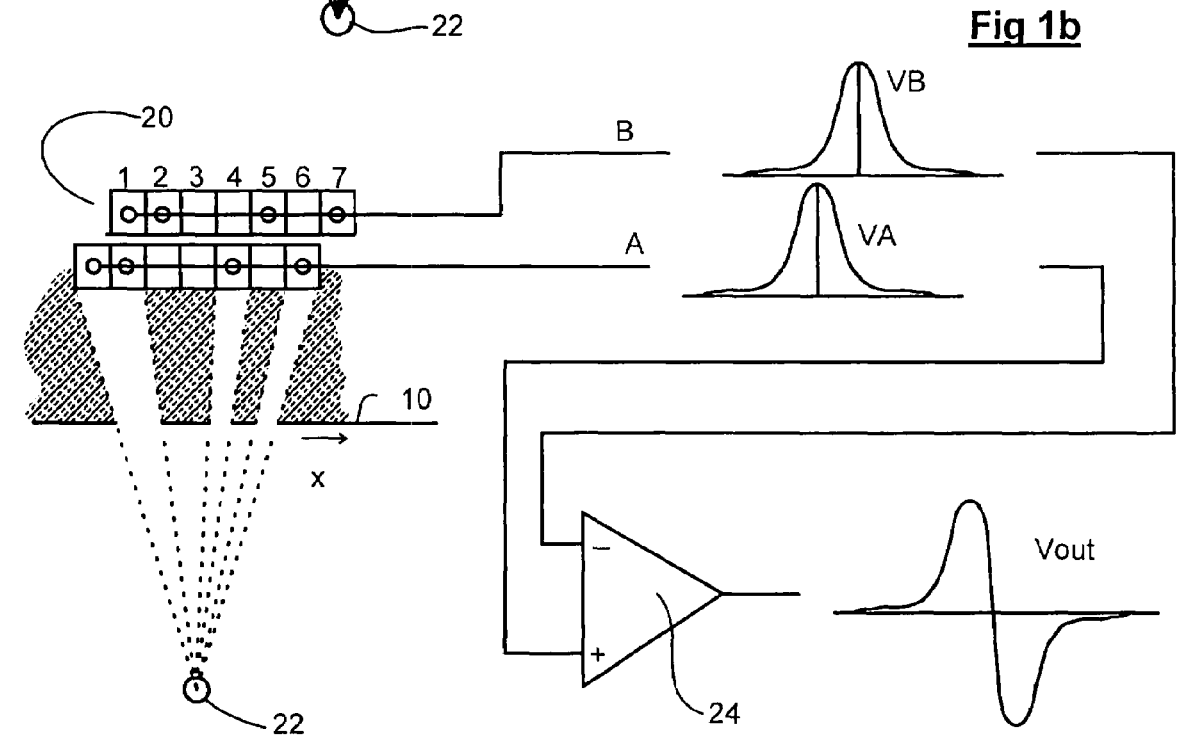

Whilst the arrangement shown in FIGS. 1a and 1b is satisfactory, it could be improved. FIGS. 2a,b and c illustrate an improved embodiment of the invention.

The components used in FIGS. 2a,b and c are similar to those illustrated in FIGS. 1a and b, however, only one row of detectors 20' is used in FIGS. 2a,b and c. The reference mark 1100101 is used again but the way in which the corresponding detector elements are arranged and monitored is different. The reference mark pattern is written in the second row of the table illustrated in FIG. 2c. The next row in this table has the same pattern displaced one place to the left (it could be more than one place and could be displaced to the right). The two rows are subtracted one column at a time and the result is given in the lowest row. This result dictates the pattern of the detector elements. Now, a "1" value in the lowest row dictates that a corresponding detector element (i.e. elements 3,6 and 8) should be connected to output A and a "−1" value in the row dictates that a corresponding detector element (i.e. elements 1,5 and 7) should be connected to output B. The resultant output of these connections when the 1100101 reference mark is detected is the outputs $V_A$ and $V_B$. When the outputs are subtracted a zero-crossing signal $V_{OUT}$ is obtained again. In this way the detector element patterns relate to the reference mark pattern.

Since only one single row of detectors is used in this embodiment the reader is less susceptible to yaw misalignment and is cheaper to produce.

FIG. 3 shows a simplified electrical schematic diagram of one way in which the signals from the detectors 20' of FIGS. 2a and b can be processed. The same scheme could be used for the arrangement shown in FIGS. 1a and b also. Detector elements in the form of photodetector diodes D1 to D8 are shown. Diodes D3,D6 and D8 are connected to the input of an amplifier 26A for turning their current outputs into a voltage $V_A$. Diodes D1,D5 and D7 are likewise connected to an amplifier 26B. The outputs of the amplifiers 26A and 26B are connected to the input of difference amplifier 24 which subtracts $V_B$ from $V_A$ to produce an output signal $V_{OUT}$. Diodes D2 and D4 are not used and are connected to 0V in this embodiment, but may be used to determine the position of the reference mark by comparing the signals coming from each these (or any) unused elements.

The circuit in FIG. 3 contains resistors R, arranged in a manner which will be apparent to one skilled in the art.

The amplitude of the $V_{OUT}$ signal is used in this instance to activate a further circuit (not shown) which produces a signal when $V_{OUT}$ crosses zero.

In addition to the difference amplifier 24 a summing amplifier 28 is shown. This amplifier sums the voltages $V_A$ and $V_B$ to produce a voltage $VC_{OUT}$. $V_A$ and $V_B$ will be at a maximum when all the respective photodiodes are illuminated i.e. when a solid block of "1"s (in this instance) is encountered by the detector. $VC_{OUT}$ can be used to detect control marks on the scale e.g. end stops. Other values of $VC_{OUT}$ e.g. zero, ½, ¾ of maximum can be used to indicate other control marks.

Figure 4:
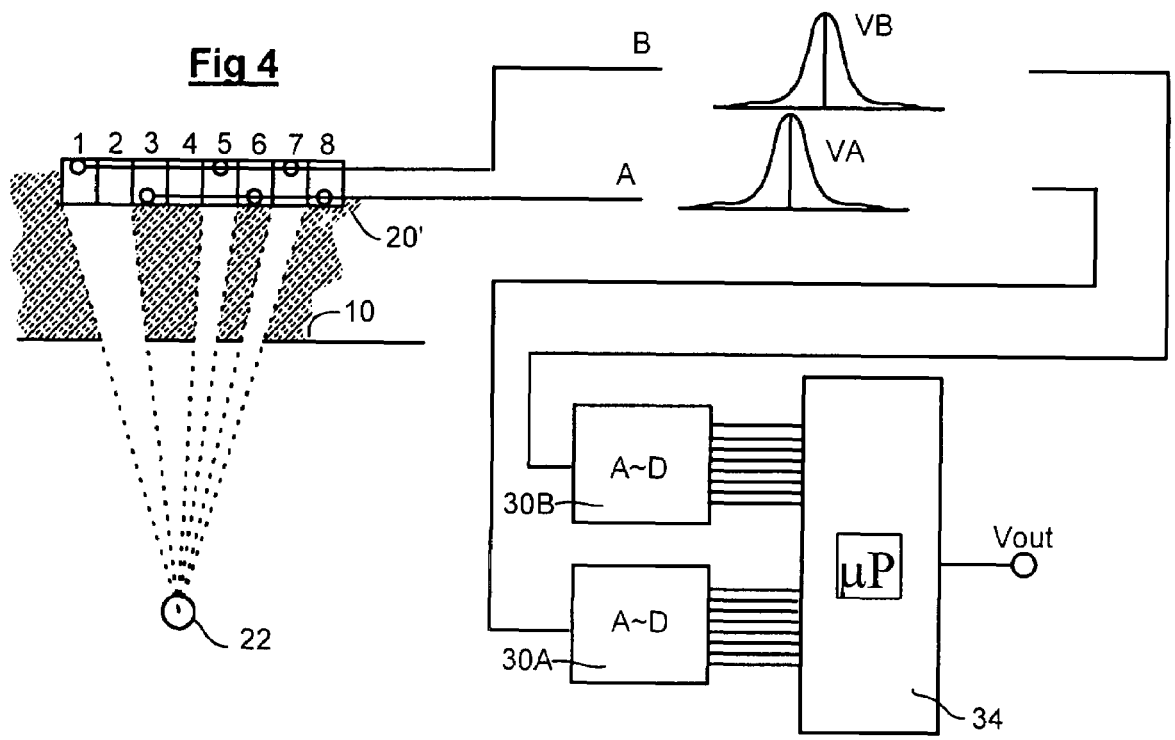
FIGS. 4, 5, 6 and 7 show alternative reference mark reader arrangements.

FIG. 4 shows an alternative arrangement for processing the signals produced by the detectors 20'. Voltage signals $V_A$ and $V_B$ are fed into two respective analogue-to-digital converters (A-D) 30A and 30B. These A-Ds in turn feed a microprocessor 34 which gives a reference pulse output. The microprocessor might be used to convert the voltage signals $V_A$ and $V_B$ into digital form without the need for the A-Ds 30A and 30B. In a further modification (not illustrated) each detector element may be connected directly to a microprocessor such that each output of each element may be processed individually, e.g. being summed appropriately or processed according to an algorithm. In order to get a zero crossing point and hence accurate position data from the reader it is necessary to have balance of signals coming from channels A and B.

Figure 5:
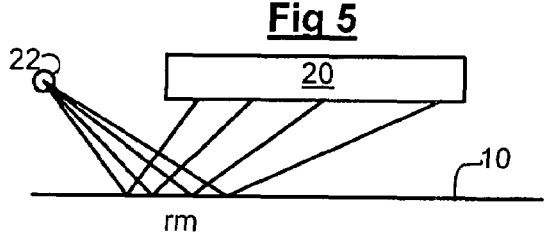
Figure 6:
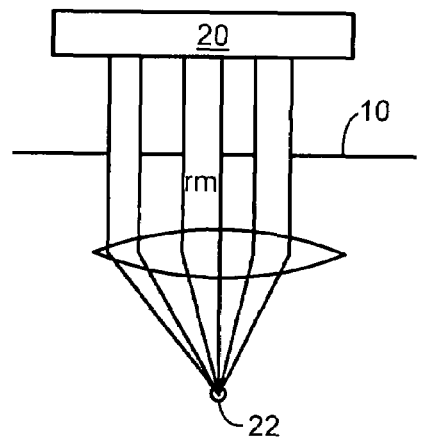
Figure 7:
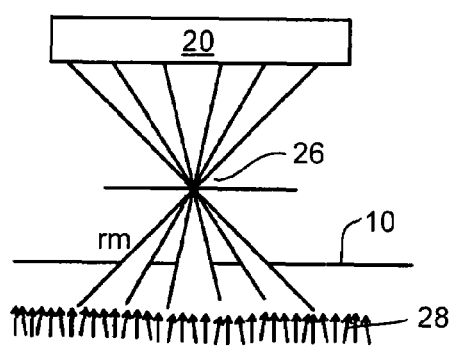

FIGS. 5, 6 and 7 show alternative configurations of detector 20 and scale 10. In FIG. 5 a reflective scale 10 is used and a light source 22 is to one side of the detector block 20. The reference mark could be reflective and the scale background non-reflective or vice versa. The light 22 could be in the middle of the block 20.

FIG. 6 shows a collimated light source producing light which passes through a transparent reference mark on scale 10. FIG. 7 shows a diffuse light source 28 producing light which passes through a reference mark on scale 10 and an imaging device such as pinhole, slit or lens 26. From the imaging device the light propagates to the detector 20.

In FIGS. 5, 6 and 7 the same detector arrangement as described above may be used.

Many variants and modifications to the embodiments described and illustrated will be apparent. The reference mark is illustrated as being incorporated into an incremental scale. However, it is possible that a separate reference mark may be provided and the invention need not be used with an incremental scale. The reader may be moved whilst the scale is stationary or vice versa. Both may move relative to each other. The invention is described with reference to light and a light source. The light could be a point source e.g. a laser diode, an area source e.g. an LED, diffuse light e.g. an LED array or ambient light. The light used could be convergent, divergent, collimated or diffuse. The light may not be visible, it could be infra-red light or some other part of the electromagnetic spectrum. The invention could be practised with detectors other than light detectors e.g. magnetic detectors for use with a magnetic reference mark may be employed. A patterned reference mark having a pattern 1100101 is illustrated but any recognisable pattern could be used. The scale on which the pattern is formed need not extend in a linear manner as shown but could be a rotary or arcuate scale (an encoder) or a 2-dimensional scale, e.g. a grid. In practice a 24 bit series of "1"s and "0"s representing light transmissive/reflective, and non-transmissive/non-reflective parts of a mark has proven satisfactory. One example of such a series is 110101010110100100110011.

The invention claimed is:

1. A reference mark detector for use with a metrological scale or encoder having a patterned reference mark movable relative to the reference mark detector, the detector comprising:
   a detector array for detecting the patterned reference mark, the detector array comprising at least two sets of detector elements, each set being formed as a pattern which relates to the pattern of the reference mark, each detector element of each set of detector elements having an output;
   a summer, for summing each of the outputs from each of the elements of a set with the other elements of the same set; and
   a subtractor, for subtracting the summed output from a second of the sets from the summed output of a first of the sets.

2. A reference mark detector as claimed in claim 1, wherein the pattern of the first and second set of detectors is non-periodic.

3. A reference mark detector as claimed in claim 1, wherein the detector array comprises two rows of elements, the first of the rows containing a first one of the sets of detector elements and the second row containing a second one of the sets of detector elements.

4. A reference mark detector as claimed in claim 3, wherein the first of the rows is displaced relative to the second of the rows in a direction of movement of the reference mark detector relative to the reference mark in use.

5. A reference mark detector as claimed in claim 1, wherein the detector array comprises a single row, a first set of detector elements and a second set of detector elements comprising detector elements in the row.

6. A reference mark detector as claimed in claim 5, wherein the first set of detector elements are connected together to provide a distinct output when the reference mark is detected in a first position and the second set are connected together to provide a distinct output when the reference mark is detected at a position different to the first position.

7. A reference mark detector as claimed in claim 6, wherein the position of the first and second set of detector elements correspond to positions in a notional table, the first row of the table containing high or low values corresponding to the pattern of the reference mark, the second row of the table containing the same values, the values in the second row being displaced relative to the position in the table of the values of the first row in the direction of the rows, each value from the second row being deducted from the values of the first row immediately above the values of the second row to form a resultant for each position in the table, the position in the table of the positive high values of each resultant representing the positions of the first set of detector elements and the positions in the table of the negative high values of each resultant representing the positions of second set of detector elements.

8. A reference mark detector as claimed in claim 2, wherein the summing of the outputs and the subtraction of the sums is done digitally.

9. A metrological scale and a scale reader for determining a displacement of the reader relative to the scale, comprising:
   a metrological scale having periodic markings for incremental measurement and including a patterned reference mark,
   the scale reader including a reference mark detector including a detector array, the array comprising at least two sets of detector elements, and
   each set of the detector elements having separately processed outputs; and
   a circuitry for producing a signal from the outputs of the elements, the signal having a value which crosses zero when the reference mark is detected by the reference mark detector.

10. A metrological scale or encoder as claimed in claim 9, the means for producing the signal includes summing the outputs of each of the elements in a first set of the said at least two sets to produce a first summed output and summing the output from a second set of the said at least two sets to produce a second summed output, then subtracting the second summed output from the first summed output.

11. A metrological scale or encoder as claimed in claim 9, wherein the array is formed as at least two rows and a first one of the said sets is included in one of the rows, and a second set is included in an other of the two rows.

12. A metrological scale or encoder as claimed in claim 9, wherein the array is formed as a single row and a first and second set of sets of elements are comprised in the single row.

13. A metrological scale as claimed in claim 9, wherein the reference mark comprises bits missing or added to the periodic markings of the scale or encoder.

* * * * *